United States Patent [19]

Cedro, III et al.

[11] 4,094,815

[45] June 13, 1978

[54] REGENERATION OF ACTIVATED CARBON HAVING MATERIALS ADSORBED THEREON

[75] Inventors: Vito Cedro, III, Pittsburgh; Donald L. Kinosz, Tarentum, both of Pa.; Thomas G. Lamberti, II, Palestine, Tex.

[73] Assignee: Aluminum Company of America, Pittsburgh, Pa.

[21] Appl. No.: 802,633

[22] Filed: Jun. 2, 1977

[51] Int. Cl.$^2$ ............................................. B01J 21/20
[52] U.S. Cl. .............................. 252/415; 252/411 R; 423/240; 423/341; 423/472
[58] Field of Search ............... 252/411 R, 411 S, 415, 252/416, 421, 419

[56] References Cited

U.S. PATENT DOCUMENTS

| 1,843,616 | 2/1932 | Mackert | 252/419 |
| 2,587,425 | 2/1952 | Adams et al. | 252/416 |
| 3,639,265 | 2/1972 | Johnson | 252/411 R |
| 3,714,040 | 1/1973 | Jordan et al. | 252/415 |
| 3,976,597 | 8/1976 | Repik | 252/421 |

OTHER PUBLICATIONS

*Chem. Eng. Progress;* vol. 47, No. 9, pp. 473–480 (1951), "Kinetics of the Catalytic Formation of Phosgene" Potter; C., et al.

*Primary Examiner*—Winston A. Douglas
*Assistant Examiner*—P. E. Konopka
*Attorney, Agent, or Firm*—John P. Taylor

[57] ABSTRACT

Activated carbon having adsorbed materials thereon is regenerated by passing a mixture of gases and/or vapors capable of exothermically reacting through the bed. The heat of reaction liberated by the reaction heats the carbon bed sufficiently to permit removal of the adsorbed materials thereon. The bed may then be further purged with an inert gas to complete the removal of the adsorbed materials.

6 Claims, 1 Drawing Figure

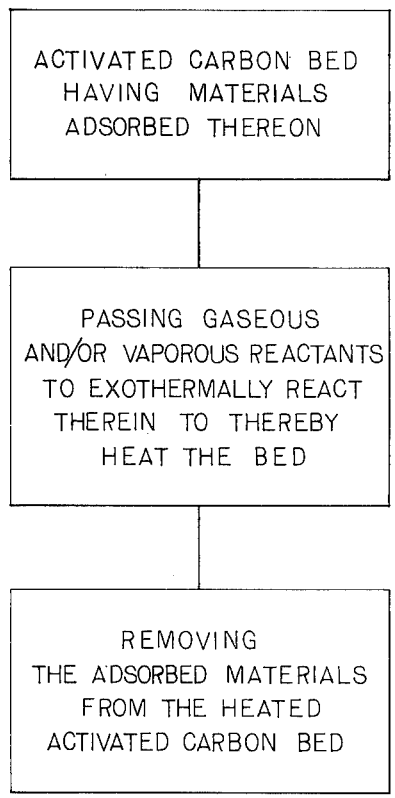

```
┌─────────────────────────┐
│   ACTIVATED CARBON BED  │
│    HAVING  MATERIALS    │
│    ADSORBED THEREON     │
└─────────────────────────┘
             │
┌─────────────────────────┐
│     PASSING GASEOUS     │
│ AND/OR VAPOROUS REACTANTS│
│   TO EXOTHERMALLY REACT │
│    THEREIN TO THEREBY   │
│       HEAT THE BED      │
└─────────────────────────┘
             │
┌─────────────────────────┐
│        REMOVING         │
│  THE ADSORBED MATERIALS │
│    FROM THE HEATED      │
│   ACTIVATED CARBON BED  │
└─────────────────────────┘
```

REGENERATION OF ACTIVATED CARBON HAVING MATERIALS ADSORBED THEREON

BACKGROUND OF THE INVENTION

This invention relates to the regeneration of activated carbon. More particularly, the invention relates to the regeneration of activated carbon by exothermic reaction of gases and/or vapors passed therethrough.

Activated carbon beds used for purification processes must be periodically regenerated to remove the materials adsorbed thereon. For example, in copending patent application Ser. No. 765,346, filed Feb. 3, 1977 entitled "Disposal of Waste Gases from Production of Aluminum Chloride", assigned to the assignee of this invention, activated carbon beds are shown for the adsorption of various materials emanating from a chlorinator used to chlorinate aluminum oxide. The activated carbon adsorber is particularly useful in that instance for the absorption of other heavy metal chlorides. The activated carbon bed is then regenerated by passing a heated gas such as $N_2$ or $CO_2$ therethrough to heat the carbon bed causing the adsorbed materials to be swept out with the purging gas.

Unfortunately, however, such processes require substantial energy to heat the inert sweeping gas such as $N_2$, $CO_2$, etc. It would be desirable to provide a means for regenerating the activated carbon bed without the necessity of adding additional heat energy to the process.

It is known to react gases and/or vapors together to exothermically form products in an activated carbon bed. For example, in copending Application Ser. No. 765,281, filed Feb. 3, 1977 and entitled "Waste Gas Treatment System for Chlorine Gas from Production of Aluminum Chloride", and assigned to the assignee of this invention, a process is described for purification of off-gases from a reactor for chlorinating aluminum compounds which comprises passing a mixture of gases containing CO, $CO_2$, and $Cl_2$ over activated carbon at a temperature of at least 100° C and for a space time of at least 0.05 minutes to form $COCl_2$ from the $Cl_2$ and the CO in the inlet gas. This process is used to remove the chlorine from the chlorinating reactor off-gas. When necessary, additional CO is added to provide the proper stoichiometry for complete reaction of the $Cl_2$.

It has now been discovered that an activated carbon bed having other materials previously adsorbed thereon may be regenerated without the addition of additional heat energy by passing gases and/or vapors through the activated carbon bed which will react in situ in the bed to release exothermic heat thereby heating the bed to a sufficient temperature to permit removal of the adsorbed materials thereon.

SUMMARY OF THE INVENTION

The invention comprises a process for regeneration of an activated carbon bed having materials adsorbed thereon which comprises passing a mixture of gases and/or vapors therethrough at an initial temperature of at least ambient temperature whereby the gases and/or vapors react to form a reaction product in situ in the bed and the exothermic heat of reaction is used to heat the carbon bed to assist in stripping the bed of the materials previously adsorbed thereon.

BRIEF DESCRIPTION OF THE DRAWING

The sole drawing of the invention is a flowsheet illustrating the process.

DESCRIPTION OF THE INVENTION

In accordance with the invention, an activated carbon bed having materials adsorbed thereon is regenerated by passing a mixture of gases and/or vapors therethrough to form a reaction product in situ in the bed thereby heating the bed by the exothermic heat liberated in the reaction.

In accordance with the invention, the gases and/or vapors which are passed through the bed must be capable of exothermically reacting together in the bed. Preferably the reaction should be one capable of initiation in the presence of activated carbon at ambient temperatures so that additional heat need not be added. However, the use of a set of reactants needing some initial heats, e.g. heating to 323° K, is deemed to be within the scope of the invention.

The gaseous and/or vapors reactants must be chosen to exclude those which would form reaction products with either the carbon bed or the materials adsorbed thereon. For example, a carbon bed having $SiCl_4$ adsorbed thereon will react with warm air. Apparently the $SiCl_4$ catalyzes a reaction between the oxygen in the air and the carbon; and the water vapor in the warm air reacts with the $SiCl_4$.

Examples of reactants which may be safely passed through a carbon bed having $SiCl_4$ adsorbed thereon and which will exothermically react together therein include CO and $Cl_2$ (which will form $COCl_2$) and $H_2$ and $Cl_2$ (which will form HCl).

Once the reaction has commenced, the temperature of the bed is monitored either at the reaction zone or at the outlet. When the temperature in the reaction zone reaches 623°–673° K or from 353°–573° K at the outlet, the flow of reactants may be replaced, if desired, by an inert gas such as $N_2$ or $CO_2$. These inert gases will continue to sweep out the adsorbed materials on the activated carbon bed while at the same time providing a gradual cooling of the activated carbon bed. Preferably, such back flushing should be continued until the bed temperature returns to about 313° K.

To permit satisfactory reaction of the reactants within the activated carbon bed, a space time of at least 0.05 minutes should be provided to insure complete reaction (and therefore efficient use) of the reactants passed into the activated carbon bed. This can usually be achieved while maintaining the velocity below about 30.5 meters/minute to avoid physically damaging the carbon in the bed. Total sweeping time will depend upon the size of the container and the desired final temperature after the regeneration is completed.

When CO and $Cl_2$ are used as the reactants the $COCl_2$ gas manufactured in situ in the activated carbon bed after separation from the stripped materials may be passed back to the chlorination reaction zone for further chlorination of aluminum oxide. The other materials which are being swept out of the bed may be passed along to a hydrolyzer such as is shown in the aforesaid Ser. No. 765,346 where the metal chlorides are hydrolyzed to form metal oxides.

The gases and/or vapors used to regenerate the bed in accordance with the invention may be passed through in either a concurrent or countercurrent direction to the normal passage of materials. Preferably, the gases and/or vapors used for regeneration are passed through countercurrent to the usual flow to back flush the carbon bed.

To further illustrate the process of the invention using CO and $Cl_2$ by way of example, an activated carbon bed having a diameter of 2.29 meters (7.5 feet) and 0.92 meters height (3 feet) containing 1816 kg (4000 pounds) of Calgon 4×8 mesh activated carbon was used to adsorb $SiCl_4$ for 29.6 hours from a chlorination reaction waste gas stream containing about 0.15% by volume $CiCl_4$ (10.9 kg/hr. $SiCl_4$). The adsorber was then regenerated for 4 hours by 4.5 m³/min. (160 SCFM) of gas at 363° K (194° F) in the following composition in percentage by volume:

$N_2$: 75%
CO: 14%
$Cl_2$: 11%

Following this initial heating of the activated bed, $N_2$ at 388° K (239° F) was passed through the bed at a rate of 3.23 m³/min. (115 SCFM) for 100 minutes. Then $N_2$ at a temperature of 573° K (572° F) was passed through the bed at a rate of 5.62 m³/min. (200 SCFM) for 150 minutes. Finally, 5.1 m³/min. (180 SCFM) of $N_2$ at 289° K (61° F) was passed through the activated carbon bed for 600 minutes to cool the carbon to 293° K (68° F). By periodically sampling the desorbed gases leaving the adsorber, it was determined that 193 kg (425 pounds) silicon chloride ($SiCl_4$) were desorbed from the activated carbon.

Having thus described the invention, what is claimed is:

1. A process for regeneration of an activated carbon bed having materials adsorbed thereon which comprises passing a mixture of reactive gases and/or vapors therethrough capable of reacting exothermically in the presence of activated carbon in situ, without reacting with either the carbon bed or the materials adsorbed thereon, wherein the exothermic heat of reaction is used to heat the carbon bed to assist in stripping the bed of materials adsorbed thereon.

2. The process of claim 1 wherein the space time of the gases and/or vapors is at least 0.05 minutes to insure substantially complete reaction in the bed.

3. The process of claim 2 wherein the flow of reactive gases and/or vapors into the bed is terminated when the temperature in the reaction zone reaches 623°–673° K and an inert gas is then passed through the bed to complete the stripping of adsorbed materials from the carbon bed.

4. The process of claim 2 wherein the flow of reactive gases and/or vapors into the bed is terminated when the temperature at the outlet of the bed reaches 353°–573° K and an inert gas is then passed through the bed to complete the stripping of adsorbed materials from the carbon bed.

5. The process of claim 2 wherein the gases and/or vapors are passed through the bed in a direction countercurrent to the direction of normal flow of te adsorbed materials into the bed.

6. The process of claim 2 wherein the reactive gases and/or vapors consist essentially of $Cl_2$ and a second reactant selected from the class consisting of $H_2$ and CO.

* * * * *

UNITED STATES PATENT AND TRADEMARK OFFICE
CERTIFICATE OF CORRECTION

PATENT NO. : 4,094,815
DATED : June 13, 1978
INVENTOR(S) : Vito Cedro, III et al It is certified that error appears in the above-identified patent and that said Letters Patent are hereby corrected as shown below:

Col. 3, line 11          Change "$CiCl_4$" to --$SiCl_4$--.

Col. 4, line 27          After "flow of" change "te"
Claim 5          to --the--.

Signed and Sealed this

Fifth Day of December 1978

[SEAL]

Attest:

RUTH C. MASON
Attesting Officer

DONALD W. BANNER
Commissioner of Patents and Trademarks